United States Patent
Krikorian et al.

(10) Patent No.: US 6,741,202 B1
(45) Date of Patent: May 25, 2004

(54) TECHNIQUES FOR 3-DIMENSIONAL SYNTHETIC APERTURE RADAR

(76) Inventors: Kapriel V. Krikorian, 463 Park Springs Ct., Oak Park, CA (US) 91377; James G. Chow, 6738 Los Verdes Dr., Rancho Palos Verdes, CA (US) 90275; Robert A. Rosen, 1648 Meander Dr., Simi Valley, CA (US) 93065

( * ) Notice: Subject to any disclaimer, the term of this patent is extended or adjusted under 35 U.S.C. 154(b) by 0 days.

(21) Appl. No.: 10/425,217

(22) Filed: Apr. 29, 2003

(51) Int. Cl.[7] .............................................. G01S 13/90
(52) U.S. Cl. ........................ 342/25; 342/102; 342/140; 342/156
(58) Field of Search ............................ 342/25, 64, 102, 342/140, 145, 156, 157, 189–191, 378–384; 382/103, 106, 294

(56) References Cited

U.S. PATENT DOCUMENTS

| 5,949,364 A | * | 9/1999 | Katzberg et al. ............... 342/25 |
| 6,025,800 A | * | 2/2000 | Hager .......................... 342/450 |
| 6,150,972 A | * | 11/2000 | Bickel et al. .................. 342/25 |
| 6,384,766 B1 | * | 5/2002 | Ulander ....................... 342/25 |

FOREIGN PATENT DOCUMENTS

| EP | 533223 A1 | * | 3/1993 | ........... G01S/13/44 |
| JP | 56061672 A | * | 5/1981 | ........... G01S/13/90 |

OTHER PUBLICATIONS

Christopher T. Allen, "Interferometric Synthetic Aperture Radar", 1995, Department of Electrical Engineering and Computer Science and Radar Systems and Remote Sensing Laboratory, University of Kansas, 8 pages.*

* cited by examiner

Primary Examiner—Thomas H. Tarcza
Assistant Examiner—Isam Alsomiri
(74) Attorney, Agent, or Firm—Leonard A. Alkov (57) ABSTRACT

The height of a radar target above a horizontal plane at a location within the horizontal plane is measured using a synthetic aperture radar (SAR). The synthetic aperture radar is mounted on a moving platform. The moving platform moves along a continuous climbing path with respect to the horizontal plane acquiring a plurality of SAR arrays of radar return information. Monopulse , Interferometric SAR (IF-SAR), and shadow length height measurements are fused to refine the target height measurement. Monopulse and IFSAR are combined to resolve target height ambiguities. The SAR arrays are separated vertically, at separate heights with respect to the target, and acquired sequentially in time, as a single pass.

11 Claims, 6 Drawing Sheets

TECHNIQUES FOR 3-DIMENSIONAL SYNTHETIC APERTURE RADAR

BACKGROUND OF THE INVENTION

1. Field of Invention

This invention is in the field of radar signal processing for the measurement of target (scatterer) elevation and the acquisition and creation of 3-dimensional maps using Synthetic Aperture Radar (SAR).

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform.

Synthetic aperture radar (SAR) systems have been developed to acquire images of stationary objects by coherently integrating phase history from multiple pulse returns. High resolution maps are achieved by coherently combining return signals reflected from transmitted pulses in the cross range direction. Formation of focused SAR images or maps requires accurate information on platform position and velocity to coherently combine pulse returns from multiple pulses. The process of aligning pulses for coherent combination is referred to as motion compensation, and is usually performed with the raw radar data, at the early stage of image formation process.

The plurality of returns generated by the transmitted pulses along a known path of the platform make up an array length. During the array length, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array length.

The plurality of pulses transmitted during an SAR array length, when coherently combined and processed, result in image quality comparable to a longer antenna, corresponding approximately to the "length" traveled by the antenna during the array length.

Using a SAR, it is desired to map not only the range, azimuth, r,θ, position of particular scatterer but also the height of the scatterer, z. Typically, this has been done using Interferometric Synthetic Aperture Radar (IFSAR), using a plurality of antennas located on the same moving platform. Each antenna acquires its own set of data, then the sets of data are used in interferometer fashion to resolve z for each scatterer. The phase of the returns from each antenna needs to be preserved accurately to extract the mapping information. Such a radar is discussed by Graham, L. C. in *Synthetic Interferometer Radar for Topographic Mapping*, Proceedings of the IEEE, Vol 62, No 6, pp 763–768, June 1974, incorporated herein by reference in its entirety.

In the alternative, the same interferometer information can be obtained from multiple passes using a single SAR antenna. The motion compensation of the acquired data has to be done to a high degree of accuracy for coherent processing and subsequent interferometric comparison. The radar returns acquired during multiple passes have to be stored for subsequent use and motion compensated to fractions of a radar frequency wavelength so as to preserve the phase information contained therein. Such phase related accuracy can prove costly and elusive, especially if the subject target (scatterer) has moved between each of the multiple passes.

In either case, the complexity of obtaining elevation, 3D information about target (scatterers) is reflected in cost constraints related to gathering amplitude and phase information creating a second map to use in an interference process with the information from a first map.

SUMMARY OF THE INVENTION

Above limitations are avoided by a method for measuring the height of a radar target located at an actual height above a horizontal plane at a location within the horizontal plane using a synthetic aperture radar. The synthetic aperture radar is mounted on a moving platform. The moving platform moves along a continuous climbing path with respect to the horizontal plane. The steps for measuring target height are:

acquiring a first synthetic aperture map containing the target from a first altitude above said plane along said path;

acquiring a second synthetic aperture map containing the target from a second altitude above said plane along said path;

acquiring a third synthetic aperture map containing the target from a third altitude above said plane along said path;

performing a monopulse measurement from information contained in said first synthetic aperture map, said second synthetic aperture map, and said third synthetic aperture map to extract a first height of the target;

comparing said first synthetic aperture map and said second synthetic aperture map to extract a second height of said target using a first interferometric comparison;

comparing said second synthetic aperture map and said third synthetic aperture map to extract a third height of said target using a second interferometric comparison;

analyzing said first synthetic aperture map, said second synthetic aperture map and said third synthetic aperture map using shadow analysis to extract a fourth height of said target;

computing a fine height from change in phase at said location by comparing said first synthetic aperture map with said second synthetic aperture map and said third synthetic aperture map;

fusing said first height, said second height, said third height, said fourth height and said fine height to calculate said actual height of said target above said plane.

DETAILED DESCRIPTION

This invention introduces the notion of extracting information contained in three separate range azimuth (r, theta) SAR maps of radar targets (scatterers) acquired using the same radar antenna over three separate, consecutive SAR arrays to measure elevation of targets and create a 3 dimensional map showing height of targets, as well as range/azimuth target position.

Figure 1:
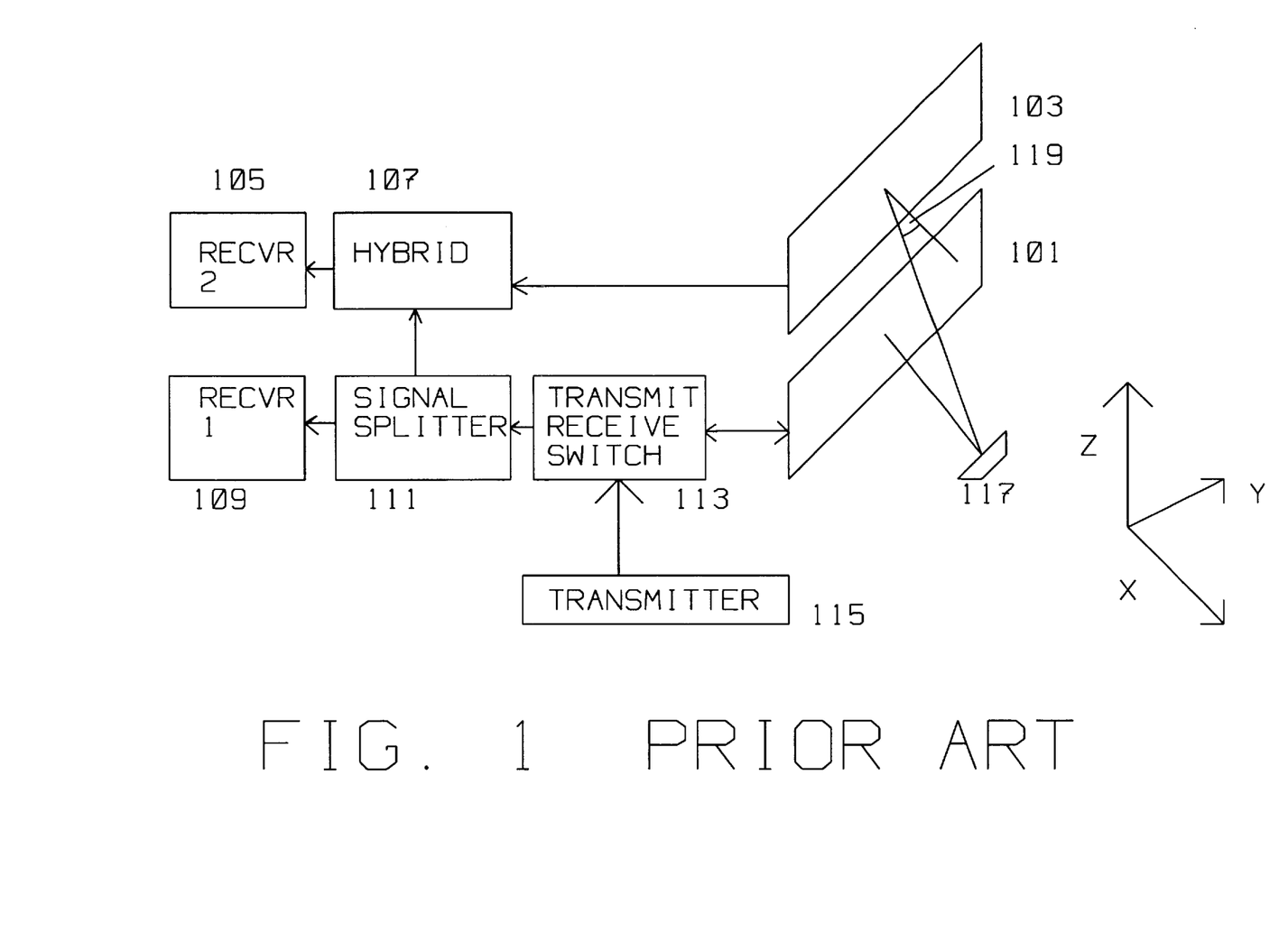
FIG. 1 is an exemplary interferometer based, synthetic aperture radar of the prior art.

FIG. 1 shows a Synthetic Aperture mapping system of the prior art capable of making three dimensional maps of the height of target (scatterers) Z as well as their position X,Y. Two side looking antennas, antenna 101 and antenna 103 are located one above the other, along the z direction.

Transmitter 115 generates a transmit pulse. The transmit pulse is passed by Transmit/Receive switch 113 to antenna 101. The return energy reflected by target 117 is passed from antenna 101 through transmit switch 113 to signal splitter 111 and receiver 109. Antenna 101 produces a standard SAR strip map using first receiver 109 from returns received. Upper antenna 103 also produces a strip map, however, the second receiver 105 is input the signal from the lower antenna from signal splitter 111 added via hybrid 107 so that an interferometric action is created. When the phase of the return from antenna 101 bucks that of antenna 103, the signal is canceled for receiver 105, and a null is created. When the signal is canceled at receiver 105, the target 117 is located at one of the nulls of the interferometer formed by antennas 101 and 103. The null position is sometimes identified as a line on the strip outputs of receiver 105 and receiver 109, thereby providing information as to the height of the target in the Z direction. In FIG. 1, target (scatterer) 117 is located at an elevation angle 119 with respect to the horizontal, as defined by X, Y plane, in a null formed by the two antennas. Depending on the gain and size of the antennas, the interferometer pattern of antenna 101 with antenna 103 may form many nulls in the Z direction, creating an ambiguity as to the height of target 117. To resolve the ambiguity, added knowledge is required as to the approximate range location of target 117 to ascertain within which null formed by the two antennas where target 117 is located.

In contrast with the prior art, the problem solved by the invention is to acquire a 3 dimensional position of a target in the X, Y plane using a single antenna on a platform making a single pass. The invention resolves ambiguities from interferometer type radar measurements of the actual height z of the target over the X, Y plane. The method of the invention is for measuring a height of a radar target located at an actual height z above a horizontal plane using a synthetic aperture radar. The synthetic aperture radar is mounted on a moving platform. The moving platform is moving along a continuous climbing path with respect to the plane of the target, accelerating along the z direction at approximately 0.2 g, and forward in the cross-range Y direction.

Figure 2:
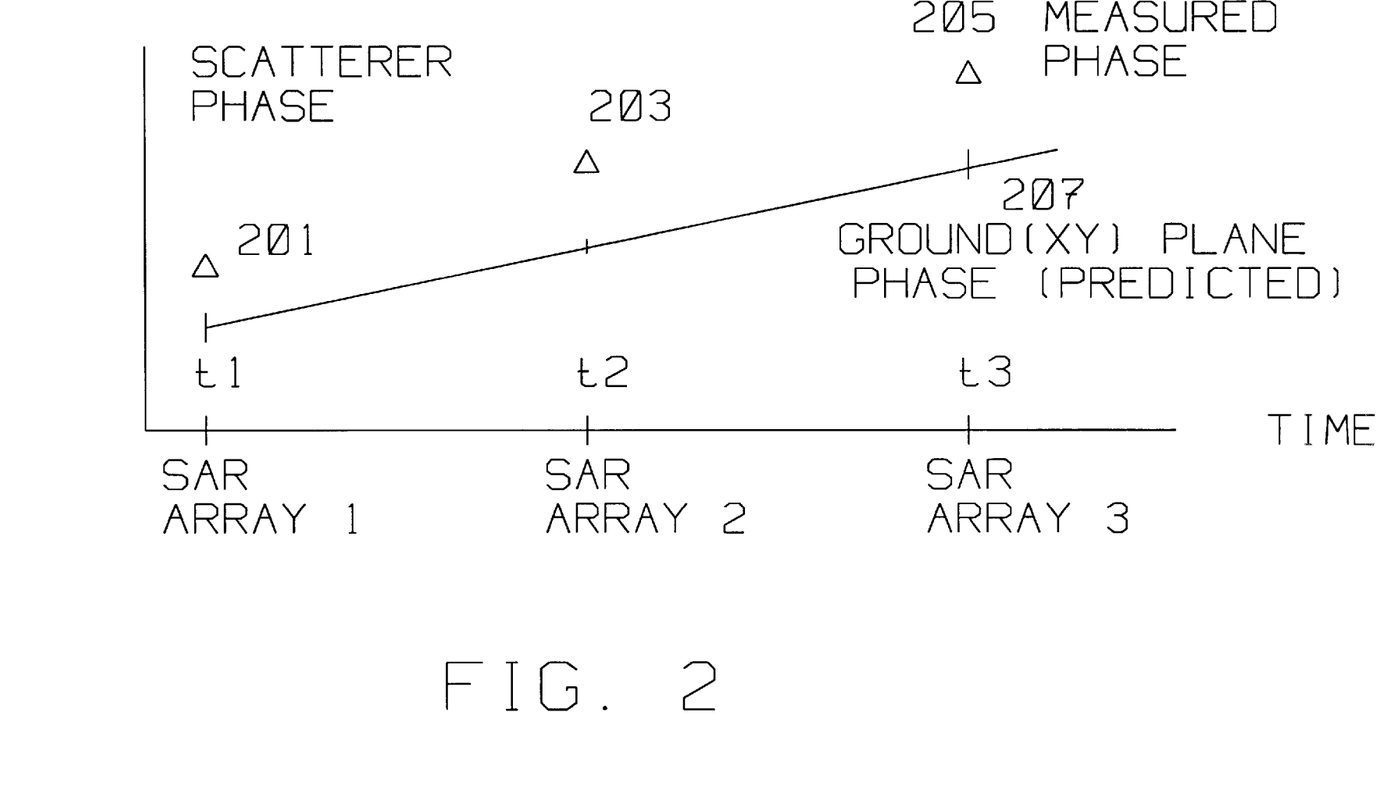
FIG. 2 is an exemplary phase change of a target measured by the present invention.

As shown in FIG. 2, the method comprises the steps of:
acquiring a first synthetic aperture map (SAR ARRAY 1 at time $t_1$) containing said target at a phase 201 from a first moving platform altitude above said plane along said path;
acquiring a second synthetic aperture map (SAR ARRAY 2 at time $t_2$) containing said target at phase 203 from a second moving platform altitude above said plane along said path; and
acquiring a third synthetic aperture map (SAR ARRAY 3 at time $t_3$) containing said target at phase 205 from a third moving platform altitude above said plane along said path.

The predicted phase of a target (scatterer) located on the ground, at Z=0, increases with time, as shown by ground plane phase return 207. Phase 207 can be predicted from geometric considerations of aircraft altitude and range to ground for a particular range bin where a ground scatterer may be located. The difference in phase between, for example phase 205 and ground phase return 205 is indicative of the height of a target Z above the ground plane X, Y.

The time between $t_1$ and $t_2$ is typically 0.25 seconds, and the upwards vertical acceleration of the platform, in the Z direction, is about 0.2 g. This means that SAR. ARRAY 2 is acquired 0.063 meters above SAR ARRAY 1. The time between $t_2$ and $t_3$ is, for example, also 0.25 seconds, although it can be different, as long as SAR ARRAY3 is located at a position above SAR ARRAY2. Conversely, the radar platform may be descending at 0.2 g while acquiring SAR maps. The method will work as long as the position of the SAR antenna where one array is acquired is vertically displaced with respect to the next array.

Fine height measurements are derived from the change in phase within a particular pixel between synthetic (SAR) arrays within the same pass. That is, the phase for a particular range/azimuth location, or pixel, changes from SAR ARRAY1 to SAR ARRAY 2 and then SAR ARRAY 3. This change in phase is indicative of the height of the target over the plane X,Y, and the actual height is derived from this change in phase. SAR ARRAY 1, SAR ARRAY 2 and SAR ARRAY 3 are arrays of information, that is, radar information generated from the Sum and Difference channel.

Figure 3:
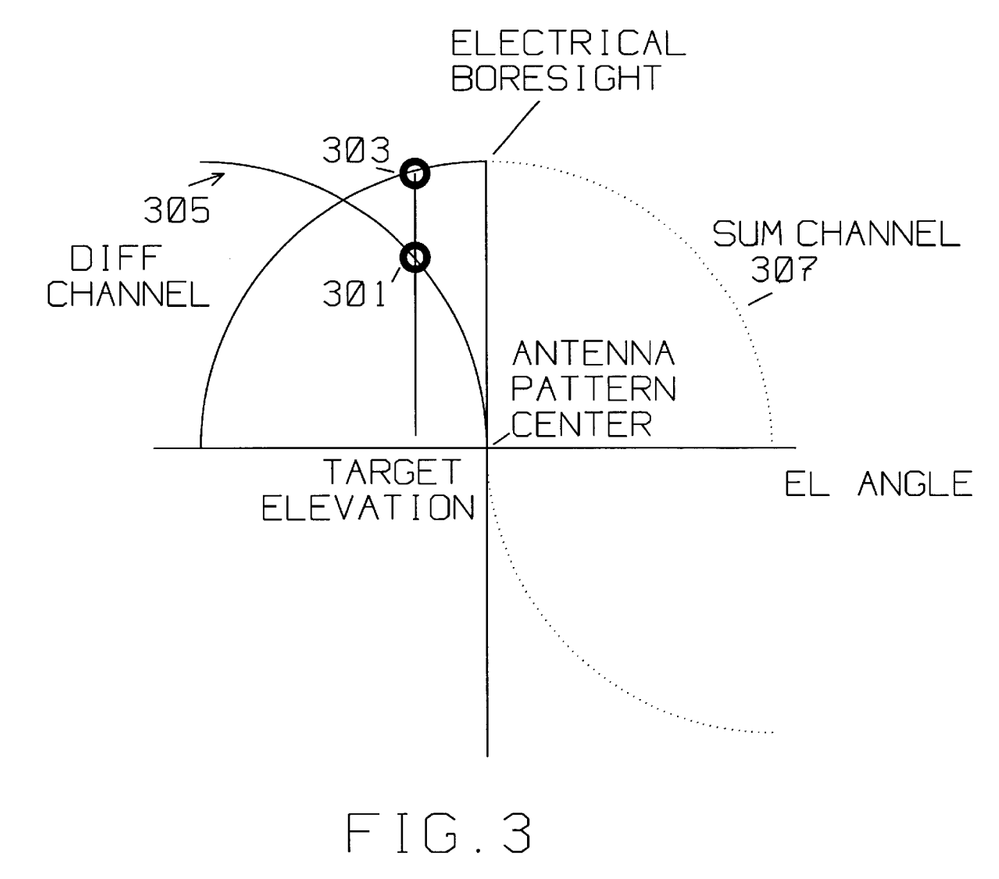
FIG. 3 is an exemplary monopulse elevation measurement used by the present invention.

FIG. 3 shows a monopulse equivalent measurement formed from the SUM Channel 307 and Difference Channel 305 of the SAR antenna, in elevation. A target is seen by the Difference Channel 305 at position 301. The same target is seen by SUM Channel 307 at position 303. The Difference channel 305 has a minimum output at the electrical boresight while the SUM channel has a maximum output. Comparing the outputs of SUM channel 307 and Difference channel 305 for a particular range bin and target within that range bin allows a first order determination of the relative elevation angle of the target with respect to the SAR antenna. Since the position of the SAR antenna is relatively well known in the X, Y, Z coordinate system, and range to target is known from range bin count, the altitude of the target can be computed from geometric considerations.

Height of target is estimated within a single SAR array using angle monopulse estimates per pixel from the sum channel and difference channel SAR images. The SAR images are formed by placing two coherent detectors in the blur region, processing the detector outputs separately to generate two independent SAR images and coherently combining the pixels to generate sum channel and difference channel images.

Figure 4:
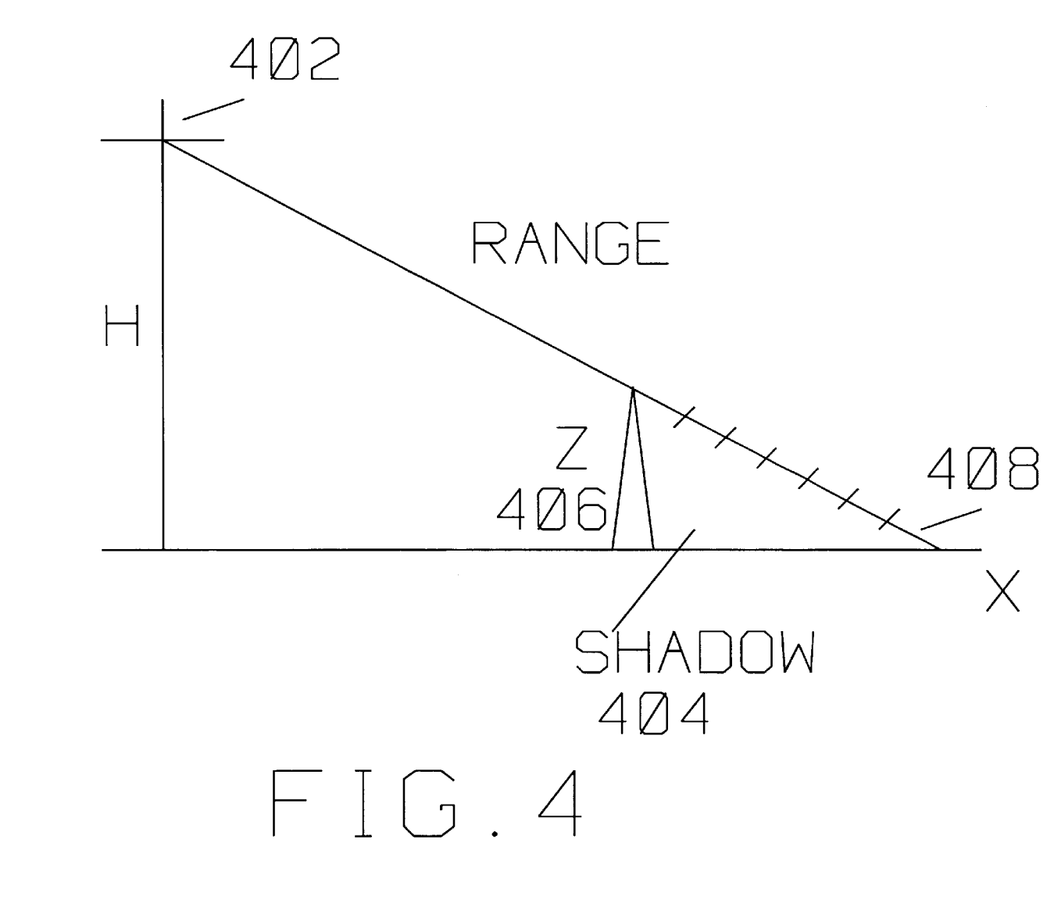
FIG. 4 is an exemplary height measurement using the shadow cast by target in range used by the present invention.

FIG. 4 shows another method used for determining target elevation based on the shadow an elevated target casts over the X, Y plane. Moving platform 402 is at an altitude H above the X, Y plane. Target 406 has height Z above the same X, Y plane. Target 406 casts a shadow 404 for all range bins beyond where target 406 intersects the range direction from platform 402, including range bin 408. From the lack of return (shadow) from range bins beyond target 406, and known platform height H above plane X, Y, another measurement of Z is computed.

Figure 5A:
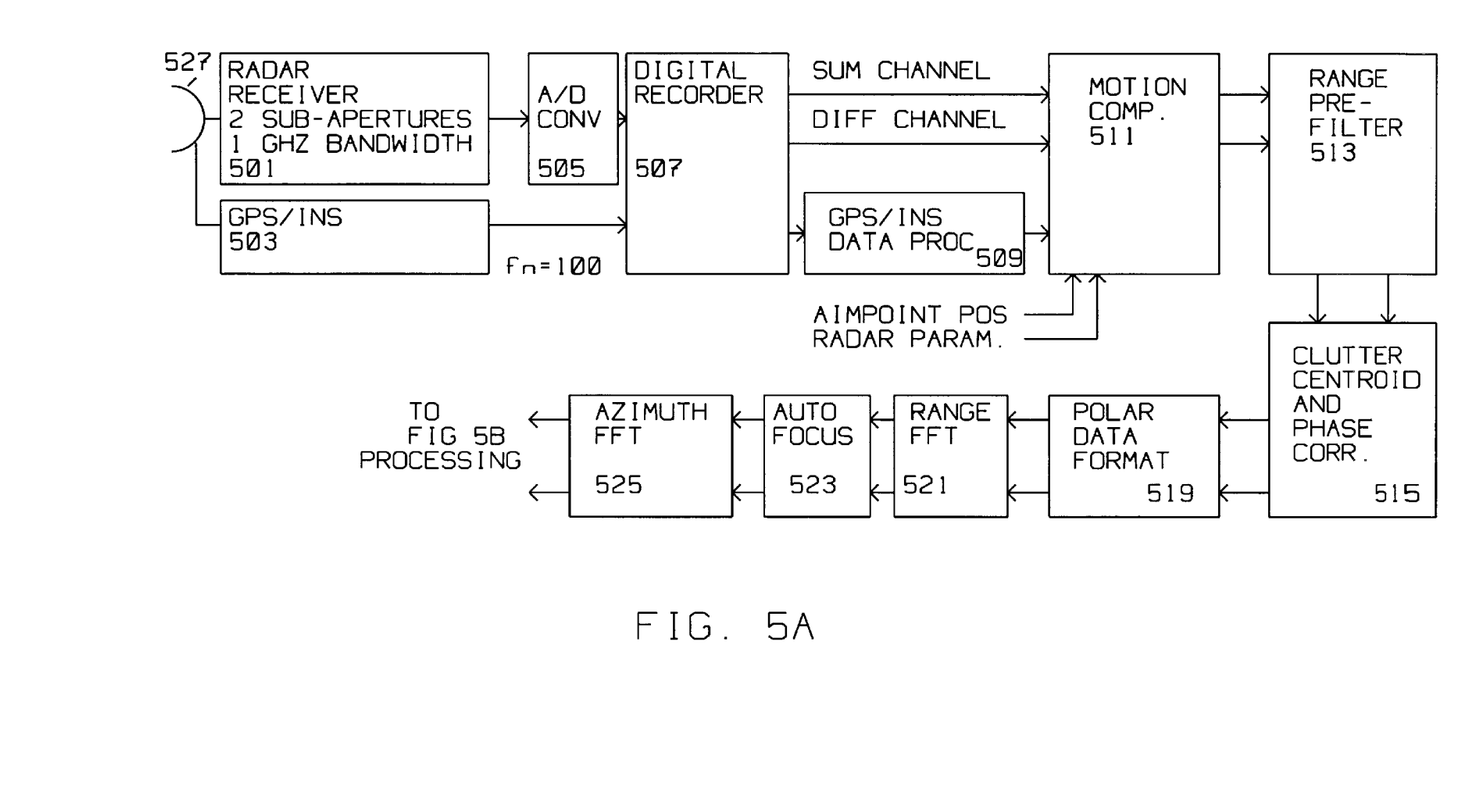
FIG. 5A is an exemplary front and for a synthetic aperture radar used with the present invention having a sum and difference channel output.

FIG. 5A shows a typical front end of a SAR radar to be used with this invention. Antenna 527 receives and transmits radar energy. Received energy is amplified by radar receiver 501. 2 sub-apertures are used, using a 1 Ghz bandwidth. Ground Positioning System augmented by an inertial navigation system (GPS/INS) 503 tags the transmitted pulses as well as the reflected returns with a precise antenna position associated with platform position. GPS/INS updates antenna position at, typically, a frequency $f_n$ of 100 Hz. A/D converter 505 converts the sum and difference channel from receiver 501 into digital format. The digitized values of amplitude and phase are recorded by digital recorder 507. Digital recorder 507 can be for example a large random access memory, multiple parallel Winchester drives or other means of recording the high data rate from A/D converter 505 as well as position tags from GPS/INS 503. GPS/INS data processing 509 uses position, velocity and acceleration data gathered during an array to motion compensate the returns in Motion compensation 511, using aimpoint position and radar parameters into account. Range pre-filtering 513, and clutter centroid and phase correction 515 prepare the data for, in one example, polar data formatting in polar data format 519. The polar formatted data is followed by Range FFT 521 and autofocus 523. Uncompensated motion error results in smearing (or often called defocusing) of target image. For the focused images with high resolution, implementation of front-end motion compensation using navigation data (503, 509, 511) may not be sufficient. A common method to obtain focused images after front-end motion compensation is the implementation of an autofocus function 523 that estimates residual phase error from partially processed video phase history (VPH) data.

Azimuth FFT 525 further prepares the sum and difference information for further processing.

Figure 5B:
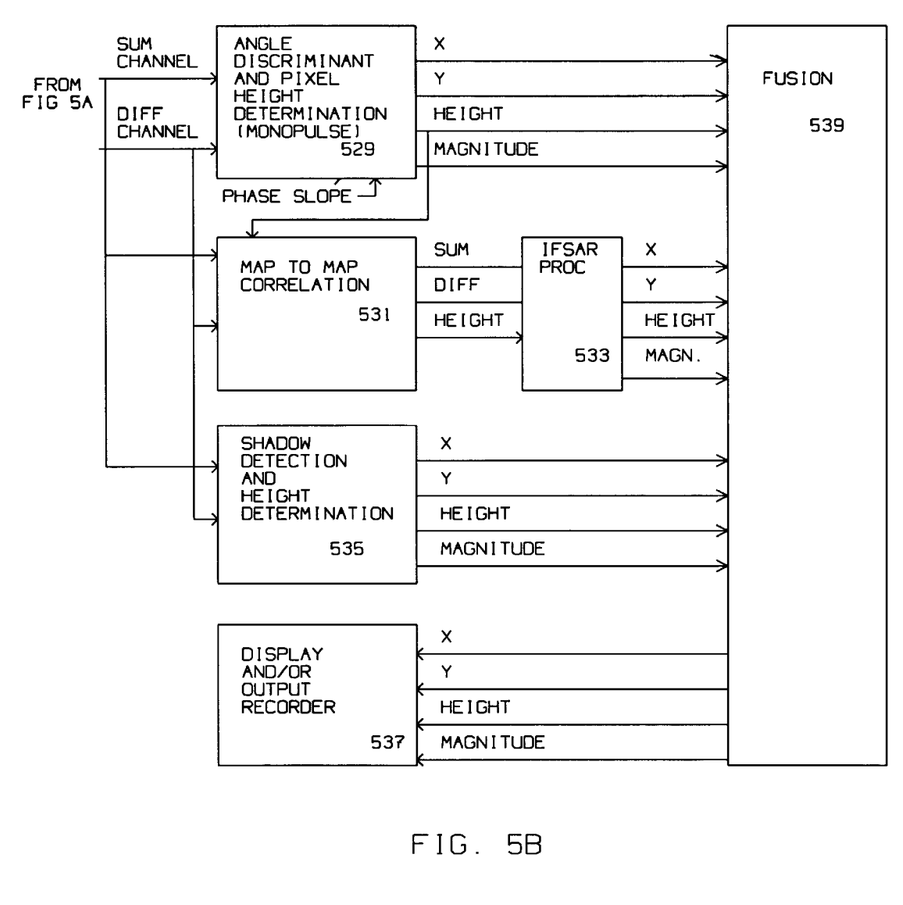
FIG. 5B shows the processing of sum and difference channel processing from FIG. 5A, in accordance with this invention.

In FIG. 5B, the output of Azimuth FFT 525 takes three parallel paths. Angle discriminant and pixel height determination uses monopulse concepts of FIG. 3 to generate X, Y. H target position as well as target magnitude, for all range bins. The phase slope, or change in phase slope in the range direction from range bin to range bin, is input into 529. The phase slope is indicative of the changes in ground elevation from range bin to range bin.

A monopulse measurement is performed from information contained in the first synthetic aperture map (array) per FIG. 2 to extract a first height estimate $Z_{E1}$ of the actual height Z of the target. Monopulse measurements of target elevation are conducted for all subsequent arrays.

The first height estimate $Z_{E1}$ from the monopulse measurement is used by Map to Map correlation 531 to align, for example, array 1 and array 2 with respect to a target of interest or some other reference point present on both arrays. This allows the use of two subsequent maps generate by array 1 and array 2 to be aligned with respect to a particular target, thereby facilitating IFSAR processing 533. IFSAR processing is conceptually similar to an interferometric measurement, in that two subsequent arrays, acquired at different platform altitudes over the X,Y plane, by the platform traveling in a generally cross-range direction, are used to provide an interferometer output. As explained in FIG. 1, interferometer related outputs have ambiguities that need to be resolved using other means. U.S. Pat. No. 6,011,505, to Pohler at al, incorporated herein by reference, describes terrain elevation measurements by interferometric Synthetic Aperture Radar and identifies one example of signal processing that could be used with this invention for IFSAR interferometric measurement.

The output of IFSAR processing 533 is an interferometry derived second estimate $Z_{E2}$ of Z, height of target above the X, Y plane, as well a target magnitude.

IFSAR processing will also compare the second synthetic aperture map and the third synthetic aperture map to extract an updated height estimate of target height using a second interferometric comparison, as well as every subsequent synthetic aperture map.

The Sun and Difference data is also used in Shadow detection and height determination 535 to generate a third estimate of target height $Z_{E3}$ using shadow analysis as detailed with respect to FIG. 4. An example of using shadow length for target height determination using shadow considerations is given, for example, by Martin Kirscht and Carsten Rinke, in 3D *Reconstruction of Buildings and Vegetation from Synthetic Aperture* (SAR) Images Institute fur Theoretische Nachrightentechnik und Informationsverarbeitung, Universitat Hannover, Germany.

Fusion 539 combines the first height estimate $Z_{E1}$ from the monopulse measurement, the second height estimate $Z_{E2}$ from ISAR processing and the third height estimate $Z_{E3}$ from shadow length analysis to derive said actual height of the target above the X,Y plane.

The procedure to combine the height estimates is:

a) Compare $Z_{E1}$ with $Z_{E3}$ for range bins/azimuth positions of interest, or display pixels, typically surrounding a target. Identify those pixels $P_1$ where i) the magnitude of the signal return from the target within the pixel of interest is at least 3 db above the average over its immediate 8 neighbors;

ii) the estimate of height in feet above the X,Y plane, $Z_{E1}$, is within a first threshold, such as 5 percent of $Z_{E4}$.

Examine estimates $Z_{E2}$ from ISAR processing for pixels $P_1$, eliminate all $Z_{E2}$ estimates not within a second height threshold, for example 5 percent, of $Z_{E1}$.

c) For the remaining $Z_{E2}$ list of pixels, compute fine relative height estimates from the change in phase within a pixel common to two subsequent SAR arrays. Display actual height of a pixel from the change in phase measurement.

All references cited in this document are incorporated herein in their entirety by reference.

Although presented in exemplary fashion employing specific embodiments, the disclosed structures are not intended to be so limited. For example, although one best method is shown for the fusion process of the three types of data derived from the SAR arrays, it is envisioned that other fusion methods would also function adequately, using angle measurement thresholds and/or phase change tests.

Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

We claim:

1. A method for measuring a height of a radar target located at an actual height above a horizontal plane at a location within said horizontal plane using a synthetic aperture radar, said synthetic aperture radar mounted on a moving platform, said moving platform moving along a continuous climbing path with respect to said plane, comprising the steps of:

acquiring a first synthetic aperture map containing said target from a first altitude above said plane along said path;

acquiring a second synthetic aperture map containing said target from a second altitude above said plane along said path;

acquiring a third synthetic aperture map containing said target from a third altitude above said plane along said path;

performing a monopulse measurement from information contained in said first synthetic aperture map, said second synthetic aperture map, and said third synthetic aperture map to extract a first height of said target;

comparing said first synthetic aperture map and said second synthetic aperture map to extract a second height of said target using a first interferometric comparison;

comparing said second synthetic aperture map and said third synthetic aperture map to extract a third height of said target using a second interferometric comparison;

analyzing said first synthetic aperture map, said second synthetic aperture map and said third synthetic aperture map using shadow analysis to extract a fourth height of said target;

computing a fine height from change in phase at said location by comparing said first synthetic aperture map with said second synthetic aperture map and said third synthetic aperture map;

fusing said first height, said second height, said third height, said fourth height and said fine height to calculate said actual height of said target above said plane.

2. A method as described in claim 1 wherein said moving platform descends along said continuous path.

3. A method as described in claim 1 wherein said change in phase is computed from the slope of change in phase of said target from a running average obtained from a plurality of synthetic aperture maps.

4. A method as described in claim 1 wherein said platform ascends 0.063 meters between said first altitude to acquire said first synthetic aperture map and said second altitude to acquire said second synthetic aperture map.

5. A method as described in claim 1 wherein a time interval between said first synthetic aperture map and said second aperture map is 0.25 seconds.

6. A synthetic aperture radar system for measuring a height of a radar target located at an actual height above a horizontal plane at a location within said horizontal plane, said synthetic aperture radar mounted on a moving platform, said moving platform moving along a continuous climbing path with respect to said plane, comprising:

an angle discriminant and pixel height determination means using monopulse comparison of a sum and a difference channel output within said synthetic aperture radar to measure said height of said radar target to generate a first target height measurement;

means for directing said synthetic aperture radar to acquire two or more subsequent arrays of information, wherein each of said two or more arrays contains said radar target, said two or more subsequent arrays separated in height above said target;

means for comparing data within said two or more subsequent arrays of information to extract interferometer based elevation measurement to generate a second is target height measurement;

means for shadow detection in each of said two or more subsequent arrays using a shadow cast by said radar target to generate a third target height measurement; and means for fusing said first target height measurement, said second target height measurement, and said third target height measurement to obtain said actual height of said radar target.

7. A radar as described in claim 6 further comprising means for combining information contained in said two or more subsequent arrays of information and said monopulse comparison to resolve ambiguous elevation information about said actual height of said radar target.

8. A radar as described in claim 6 further comprising means for computing a change in phase from the slope of change in phase of said target from a running average obtained from said two or more arrays of information and comparing said change in phase with the change in phase theoretically predicted for terrain near said radar target for each of said two or more subsequent arrays of information.

9. A radar as described in claim 6 wherein said radar ascends 0.063 meters between each of said two or more subsequent arrays.

10. A radar as described in claim 6 wherein a time interval between each of said two or more subsequent arrays is 0.25 seconds.

11. A radar as described in claim 6 wherein said moving platform accelerates along said continuous climbing path.

* * * * *